(12) United States Patent
Grylls et al.

(10) Patent No.: US 6,582,812 B1
(45) Date of Patent: Jun. 24, 2003

(54) ARTICLE MADE OF A CERAMIC FOAM JOINED TO A METALLIC NONFOAM, AND ITS PREPARATION

(75) Inventors: Richard John Grylls, Loveland, OH (US); Curtiss Mitchell Austin, Loveland, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/708,748

(22) Filed: Nov. 8, 2000

(51) Int. Cl.[7] .............................. B32B 5/18; B32B 15/00; B32B 15/04
(52) U.S. Cl. .............................. 428/307.7; 428/310.5; 428/539.5; 501/80; 501/153
(58) Field of Search .................... 428/307.7, 310.5, 428/539.5; 501/80, 153

(56) References Cited

U.S. PATENT DOCUMENTS

| | | |
|---|---|---|
| 3,718,172 A | 2/1973 | Rice et al. |
| 4,375,233 A | 3/1983 | Rossmann et al. |
| 4,422,229 A | 12/1983 | Sadler et al. |
| 4,673,435 A | 6/1987 | Yamaguchi et al. ........ 75/235 |
| 4,808,558 A * | 2/1989 | Park et al. |
| 4,818,734 A * | 4/1989 | Kanter et al. |
| 4,923,747 A | 5/1990 | McCullough, Jr. et al. |
| 4,955,135 A * | 9/1990 | Pinkhasov |
| 4,956,137 A * | 9/1990 | Dwivedi |
| 5,011,063 A | 4/1991 | Claar |
| 5,016,883 A | 5/1991 | Kobayashi |
| 5,061,660 A | 10/1991 | Park et al. |
| 5,214,011 A | 5/1993 | Breslin ........ 501/127 |
| 5,308,422 A | 5/1994 | Askay et al. |
| 5,503,213 A | 4/1996 | Pyzik et al. |
| 5,509,555 A * | 4/1996 | Chiang et al. |
| 5,518,061 A | 5/1996 | Newkirk et al. ........ 164/97 |
| 5,541,004 A * | 7/1996 | Newkirk et al. |
| 5,620,804 A * | 4/1997 | Kennedy et al. |
| 5,654,246 A * | 8/1997 | Newkirk et al. |
| 5,728,638 A | 3/1998 | Strange et al. ........ 501/127 |
| 6,025,065 A * | 2/2000 | Claussen et al. |
| 6,186,768 B1 * | 2/2001 | Schmitt |

OTHER PUBLICATIONS

Guide to Selection of Superalloys, Nickel–Base Alloys, Mid–Jun. 1978, Metal Progress, pp. 106–107.

J. Ringnald et al., "Scanning and Transmission Electron Microscopy on Composite Materials prepared by SMP and In–Situ Displacive Reactions," Inst.Phys.Conf.Ser. No. 147, Section 13, pp. 571 et seq. (1995) No Month.

Nine page printout from Internet page of BFD, Inc, www.bfd–inc.com, printed Apr. 24, 2000.

\* cited by examiner

Primary Examiner—Deborah Jones
Assistant Examiner—Jason Savage
(74) Attorney, Agent, or Firm—Gregory O. Garmong; Carmen Santa Maria; McNees Wallace & Nurick LLC

(57) ABSTRACT

An article of manufacture includes a metallic nonfoam region, and a ceramic foam region joined to the metallic region. The ceramic foam region is an open-cell solid ceramic foam made of ceramic cell walls having an intracellular volume therebetween. The ceramic is preferably alumina. The intracellular volume may be empty porosity, or an intracellular metal such as an intracellular nickel-base superalloy.

21 Claims, 4 Drawing Sheets

ARTICLE MADE OF A CERAMIC FOAM JOINED TO A METALLIC NONFOAM, AND ITS PREPARATION

This invention relates to a composite article formed of a nonfoam region and a ceramic foam region.

BACKGROUND OF THE INVENTION

In many applications, the property requirements of an article vary greatly according to location within the article. In one example, some locations within the article must have excellent mechanical properties at high temperatures and other locations within the article function largely to define the form factor (i.e., the shape) of the article and have much lower requirements for their mechanical properties. In most cases, the different property requirements are met with a single material of construction that may not be optimal for any one location but instead achieves a good balance of properties for all of the locations.

Composite materials have been developed for use at room temperature and mildly elevated temperatures. Such composite materials include the familiar fiber-reinforced organic matrix composites such as graphite fiber-epoxy composites. Structures made of such materials may have their properties tailored according to the location within the article, by changing the direction of the fibers, the volume fraction of the fibers, the type of fibers, and the like.

There have been attempts to apply these principles of composite construction to high-temperature applications. For example, components of gas turbine engines have widely varying property requirements between relatively closely spaced locations. A low-pressure gas turbine blade must be strong in the dovetail and root sections, but much of the airfoil serves largely to define a shape that is mechanically stressed to only a modest level. The mechanical properties must be retained to elevated temperatures, inasmuch as the efficiency of the engine increases with increasing operating temperature. There is a large incentive to raise the combustion gas temperature of the engine.

However, there is also a large incentive to decrease the weight of the turbine blade as much as possible, because a reduction in turbine blade weight leads to reductions in disk weight, shaft weight, bearing weight, and support weight that in turn increase the weight efficiency of the engine.

Research studies have been underway for many years to apply composite-construction principles to high-temperature components such as turbine blades. These efforts have focused on superalloys that are reinforced by particles, fibers, or whiskers of ceramic materials. Although there have been some advancements, these efforts have not been successful in the sense that there are no such composite articles in regular service today. Gas turbine blades are typically made of nickel-base superalloys that may be made hollow to reduce weight and to allow cooling air to be conveyed through the interior of the blades. The use of a composite construction would offer the promise of reducing weight while maintaining or improving performance, but no operable approach has been proposed as yet.

There is, accordingly, a need for an improved approach to articles that must operate at elevated temperatures, must have property requirements that vary substantially at different locations of the article, and must be as light in weight as possible. The present invention fulfills this need, and further provides related advantages.

BRIEF SUMMARY OF THE INVENTION

The present invention provides a composite construction that is applicable to articles which operate at high temperatures. The structure utilizes a combination of metallic regions and ceramic foam regions to tailor the properties as required for excellent mechanical properties and for low weight. The approach of the invention allows the designer of the article to determine the required combination of properties in each location, and then the article is manufactured with different materials optimized for each location.

An article of manufacture comprises a metallic nonfoam region, and a ceramic foam region joined to the metallic non foam region. The ceramic foam region comprises an open-cell solid ceramic foam made of ceramic cell walls having intracellular volume therebetween. The ceramic cell walls are preferably alumina. The intracellular volume may be empty porosity or an operable intracellular metal such as an intracellular nickel-base superalloy. The ceramic foam region may even be varied within itself, to have a first ceramic foam subregion having an intracellular volume that is empty porosity, and a second ceramic foam subregion having an intracellular volume comprising the intracellular metal. The metallic nonfoam region may be any operable metal, such as a primary nickel-base superalloy. The nonfoam region and the ceramic foam region are joined by any operable approach, such as a diffusional joint or a casting joint.

In one approach, a method of preparing an article comprises the steps of preparing a ceramic foam region by the steps of providing a piece of a sacrificial ceramic having the shape of the ceramic foam region, and contacting the piece of the sacrificial ceramic with a reactive metal which reacts with the sacrificial ceramic to form an oxidized ceramic of the reactive metal and a reduced form of the ceramic. The resulting structure comprises a ceramic foam of the oxidized ceramic compound of the reactive metal with ceramic cell walls and an intracellular volume between the ceramic cell walls, the intracellular volume comprising a reaction-product metal. The reaction-product metal may be removed to create empty porosity, or replaced with a replacement metal. The ceramic foam region is joined to a metallic nonfoam region, as by interdiffusing the two regions or casting the metallic nonfoam region around the ceramic foam region.

The present approach provides a great deal of flexibility in precisely tailoring an article that is to be used at high temperatures. The ceramic foam material is lighter in weight than a comparable superalloy, and the weight may be reduced even further by removing the reaction-product metal from the intracellular volume where mechanical property requirements are minimal and the material functions largely to define a form. Where the mechanical property requirements are higher, the reaction-product metal may be replaced with the intracellular nickel-base superalloy to produce a ceramic foam whose intracellular volume is filled with the superalloy.

The joining of the ceramic foam regions and the nonfoam regions is accomplished by any operable approach. In one technique, the regions are each fabricated separately and then joined by solid-state joining, liquid-phase joining that may be possible in some cases, or brazing with a brazing metal. In another technique, the ceramic foam region is fabricated, and the metallic nonfoam region is cast around it.

The result is an article that has the metallic nonfoam region where required for strength and ductility, and the ceramic foam region that has a high-temperature shape-retention capability but is not as strong and ductile as the metallic nonfoam region. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
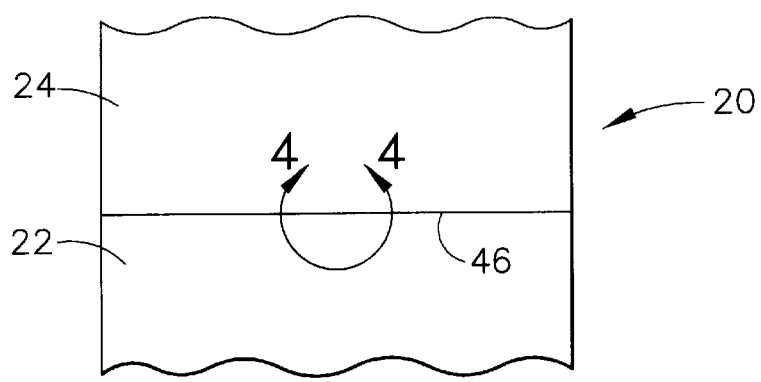
FIG. 1 is a schematic view of an article made of a ceramic foam joined to a metallic nonfoam.
Figure 2:
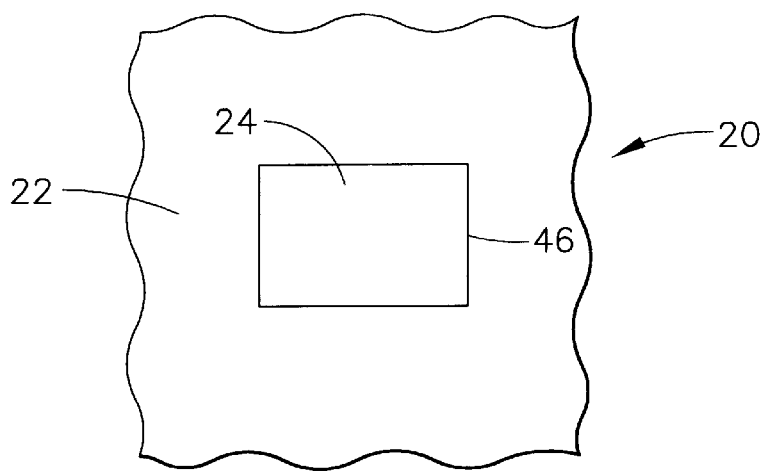
FIG. 2 is a schematic view of a second embodiment of an article made of a ceramic foam joined to a metallic nonfoam.
Figure 3:
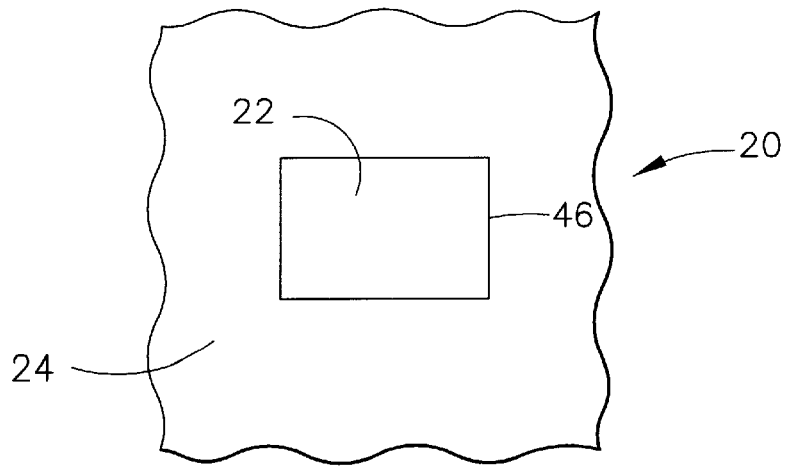
FIG. 3 is a schematic view of a third embodiment of an article made of a ceramic foam joined to a metallic nonfoam.

FIGS. 1–3 depict an article 20 comprising a metallic nonfoam region 22 and a ceramic foam region 24 joined to the metallic nonfoam region 22. In the embodiment of FIG. 1, the metallic nonfoam region 22 forms one side of the article 20, and the ceramic foam region 24 forms the other side. In the embodiment of FIG. 2, the ceramic foam region 24 is embedded within the metallic nonfoam region 22, so that the metallic nonfoam region 22 surrounds the ceramic foam region 24. In the embodiment of FIG. 3, the metallic nonfoam region 22 is embedded within the ceramic foam region 24, so that the ceramic foam region 24 surrounds the metallic nonfoam region 22. All of these embodiments are within the scope of the invention.

The ceramic foam region 24 comprises an open-cell solid ceramic foam made of ceramic cell walls having intracellular volume therebetween, as will be discussed in greater detail subsequently. The article 20 may be of any operable type. The articles 20 of most interest to the inventors are components of gas turbine engines, such as combustor components, vanes, blades, and stationary shrouds.

Figure 4:
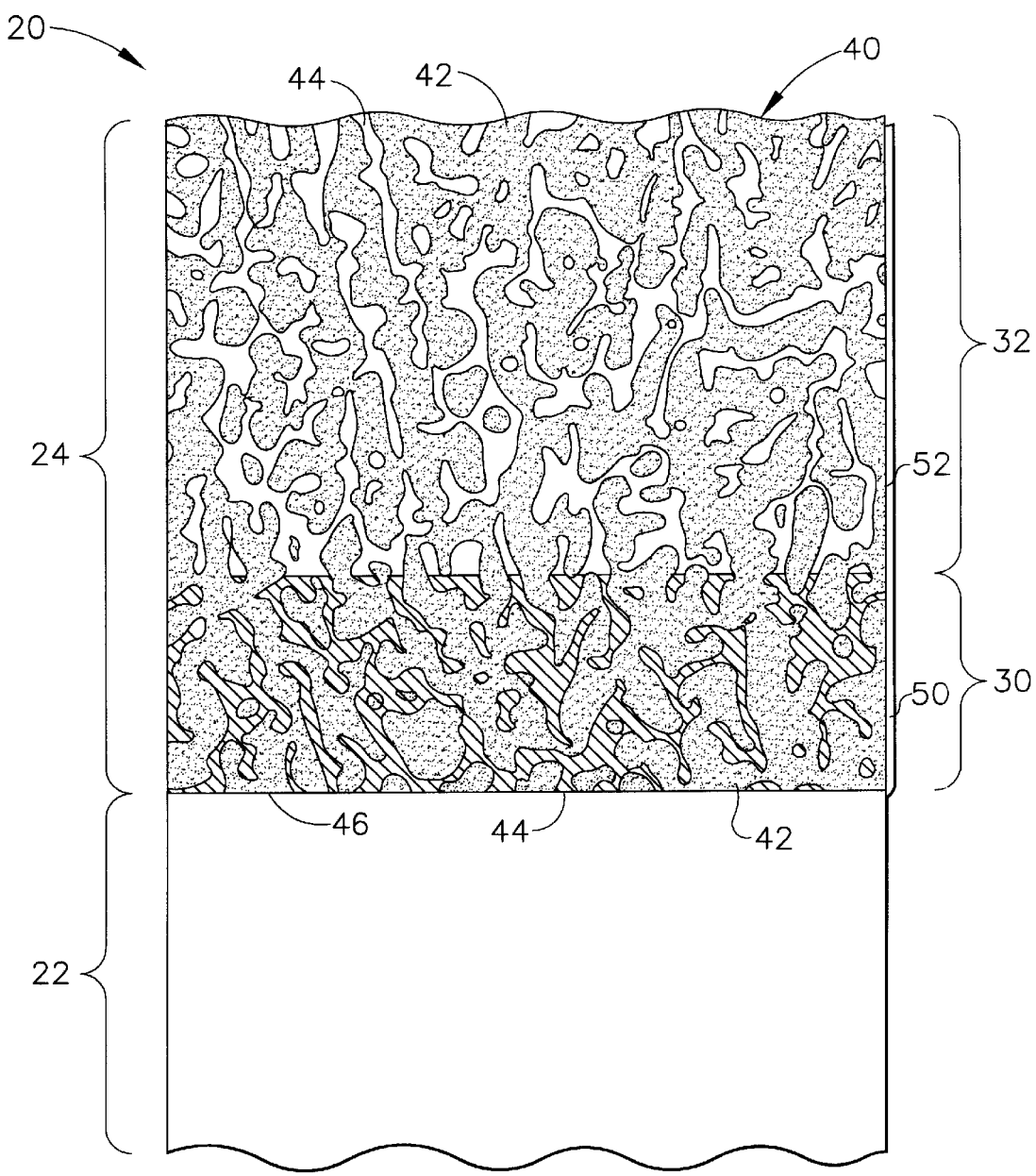
FIG. 4 is a schematic enlarged detail of the article of FIG. 1, showing the microstructure in region 4—4.

FIG. 4 illustrates the microstructure of the article 20 illustrated in FIG. 1, but it is equally applicable to the embodiments of FIGS. 2–3. The article 20 includes the metallic nonfoam region 22. The metallic nonfoam region 22 is a metal of any operable type, but is preferably a nickel-base superalloy. (The metal of the metallic nonfoam region 22 is termed the "primary" metal, to distinguish it from the "intracellular" metal that may be present in the intracellular volume of the ceramic foam.) A nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities. Specific alloys are known in the art. The metallic nonfoam region 22 may be reinforced with particles, fibers, whiskers, wires, or other reinforcement, as long as that reinforcement is not a foam.

The article 20 further includes the ceramic foam region 22, joined to the metallic nonfoam region 22. The ceramic foam region 22 may be uniform throughout, or it may include a first ceramic foam subregion 30 and a second ceramic foam subregion 32. Additional ceramic foam subregions may be present as well, if desired. In all cases, the ceramic foam region 22 is formed of an open-cell solid ceramic foam 40 comprising ceramic cell walls 42 and an intracellular volume 44 therebetween. The cell walls 42 and the intracellular volume 44 are each interpenetrating, continuous regions. The ceramic cell walls 42 are any operable ceramic, but are preferably an alumina-based material. Alumina is synonymous herein with aluminum oxide and $Al_2O_3$. The ceramic cell walls 42 preferably comprise at least about 60 percent by volume, and most preferably from about 60 to about 80 percent by volume, of the ceramic foam 40. The intracellular volume 44 preferably occupies the remainder of the volume of the ceramic foam material 40. Although it cannot be readily discerned from FIG. 4, the ceramic cell walls 42 are internally continuous, and the intracellular volume 44 is internally continuous. All portions of either phase 42 and 44 are respectively continuous, so that there is a continuous path from the external surfaces to any location within either phase.

The intracellular volume 44 may be filled with an intracellular metal or may be empty porosity. Where the intracellular volume 44 is a metal, it is preferably a nickel-base superalloy (within the class discussed above), but other types of metals may be used as the intracellular metal. Where the ceramic foam region 24 is uniform throughout, the entire intracellular volume 44 is either the intracellular metal or the empty porosity.

FIG. 4 illustrates the case where the ceramic foam region 24 is divided into subregions, in this case the first ceramic foam subregion 30 and the second ceramic foam subregion 32. These subregions 30 and 32 differ in the nature of the intracellular volume 44. In the illustrated embodiment, the intracellular volume 44 of the first ceramic foam subregion 30 is filled with intracellular metal, and the intracellular volume 44 of the second ceramic foam subregion 32 is empty porosity. This arrangement is selected because the intracellular volume 44 of the first ceramic foam subregion 30 aids in bonding of the ceramic foam region 24 to the metallic nonfoam region 24.

Figure 5:
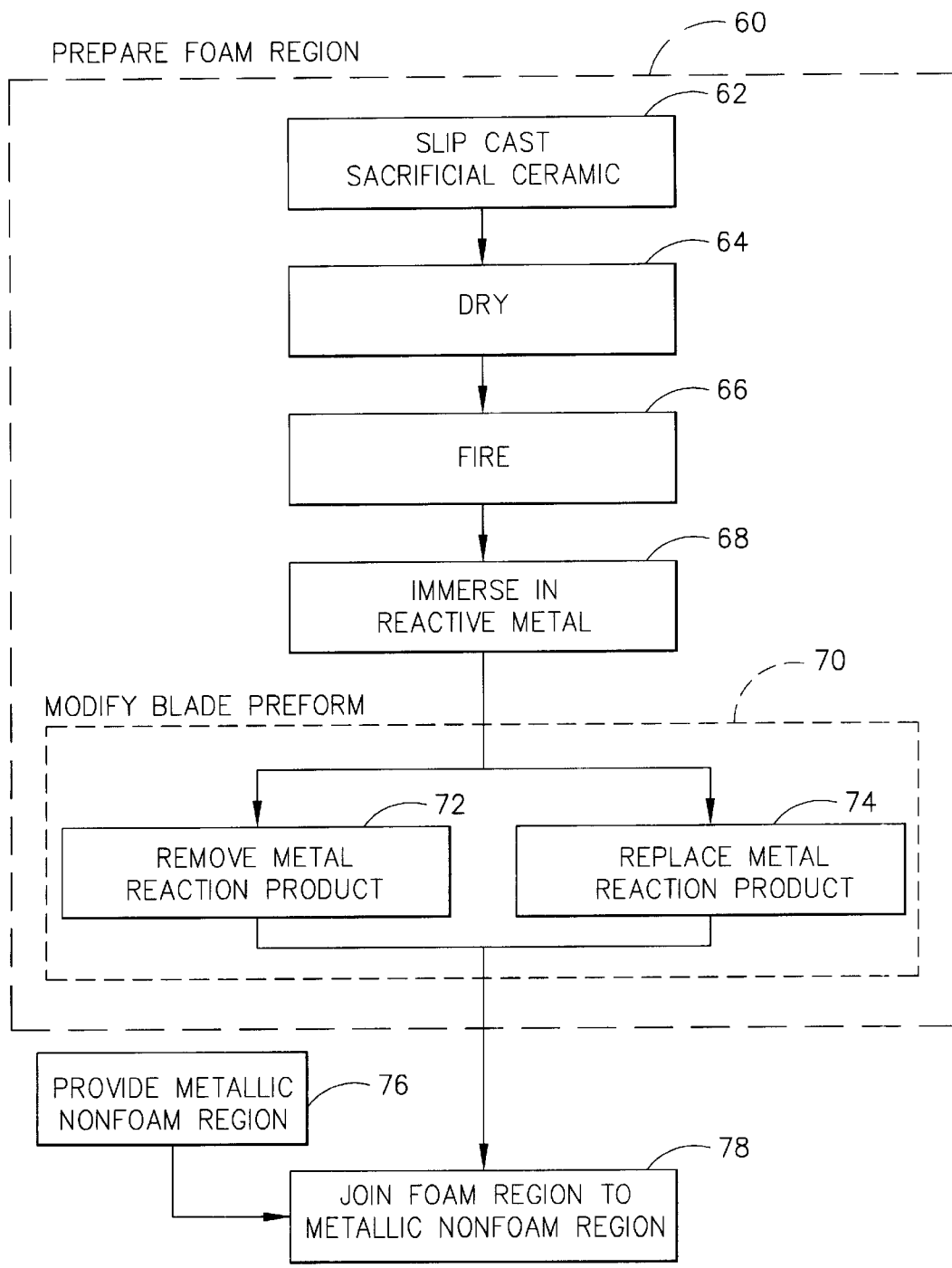
FIG. 5 is a block flow diagram of an approach for fabricating the article.

FIG. 5 illustrates a preferred method for forming the article 20. The ceramic foam region 24 is provided, numeral 60. The ceramic foam region 24 has a shape and size as required for the intended application. The ceramic foam is preferably prepared by first fabricating a sacrificial ceramic form. The sacrificial ceramic form is prepared by an operable approach. In a preferred approach, a slip of a sacrificial ceramic material is prepared and cast into a mold that has the same shape, but slightly larger dimensions, than the required dimensions of the ceramic foam, numeral 62. The preferred sacrificial ceramic material is silica (silicon dioxide, $SiO_2$). Additions may be made to the sacrificial ceramic material to modify its behavior. For example, additions that modify the firing behavior of the ceramic, such as calcia (calcium oxide) in the case of silica sacrificial ceramic, may be made. Additions that modify the porosity of the final reacted ceramic material, such as mullite, may be made. Additions that modify the properties of the final reacted ceramic material, such as boron nitride or sol gel alumina to increase the wear resistance of the final reacted ceramic material, may be made. Additions that modify the chemical composition of the final reacted ceramic, such as boron, may be made.

The slip casting of silica particles is well known in other applications, and the same procedures are used here. Typically, a slurry of silica particles and acrylic binder in water is prepared and poured into the mold. The mold and its contents are dried, numeral 64, to remove the carrier liquid. The dried slip cast material is thereafter heated to an elevated temperature to fire, consolidate, and fuse the ceramic, numeral 66. In the case of silica, a typical firing temperature is about 2000° F. and a firing time is about 4 hours. The original slip casting is made slightly oversize to account for the shrinkage during drying and firing. The required oversize is known in the art because slip casting is so widely employed for other applications, but is typically about 1–15 percent.

The steps 62, 64, and 66 together provide the sacrificial ceramic having the shape of the ceramic foam region, numeral 60.

The sacrificial ceramic form is thereafter contacted to a molten reactive metal preferably by immersion, numeral 68. The molten reactive metal is most preferably an aluminum-base metal. The preferred approach is disclosed in U.S. Pat. Nos. 5,214,011 and 5,728,638, whose disclosures are incorporated by reference. The metal may be a pure metal, or it may be an alloy containing the reactive metal. Most preferably, the reactive metal, when in alloy form, contains more of the reactive element than any other element. The reactive metal may optionally be mixed with nonreactive metals such as a large fraction of nickel and other elements of the nickel-base alloy of interest for some applications, as disclosed in the '638 patent.

While the sacrificial ceramic form is immersed in the reactive metal, the ceramic of the sacrificial ceramic form is chemically reduced and the reactive metal is chemically oxidized. (Reduction and oxidation are broadly interpreted in the sense of electron transfer.) The reactive metal becomes an oxide or oxidized form, aluminum oxide in the preferred case. As a result of a mechanism involving volume changes and internal fracturing and discussed in the '011 patent, the foam or sponge structure is formed throughout the sacrificial ceramic as it transforms from the sacrificial form-composition to the final composition. The intracellular volume that results is filled with the reaction-product metal resulting from the reaction process. The result of the immersion step 68 is a reacted ceramic foam blade preform.

Figure 6:
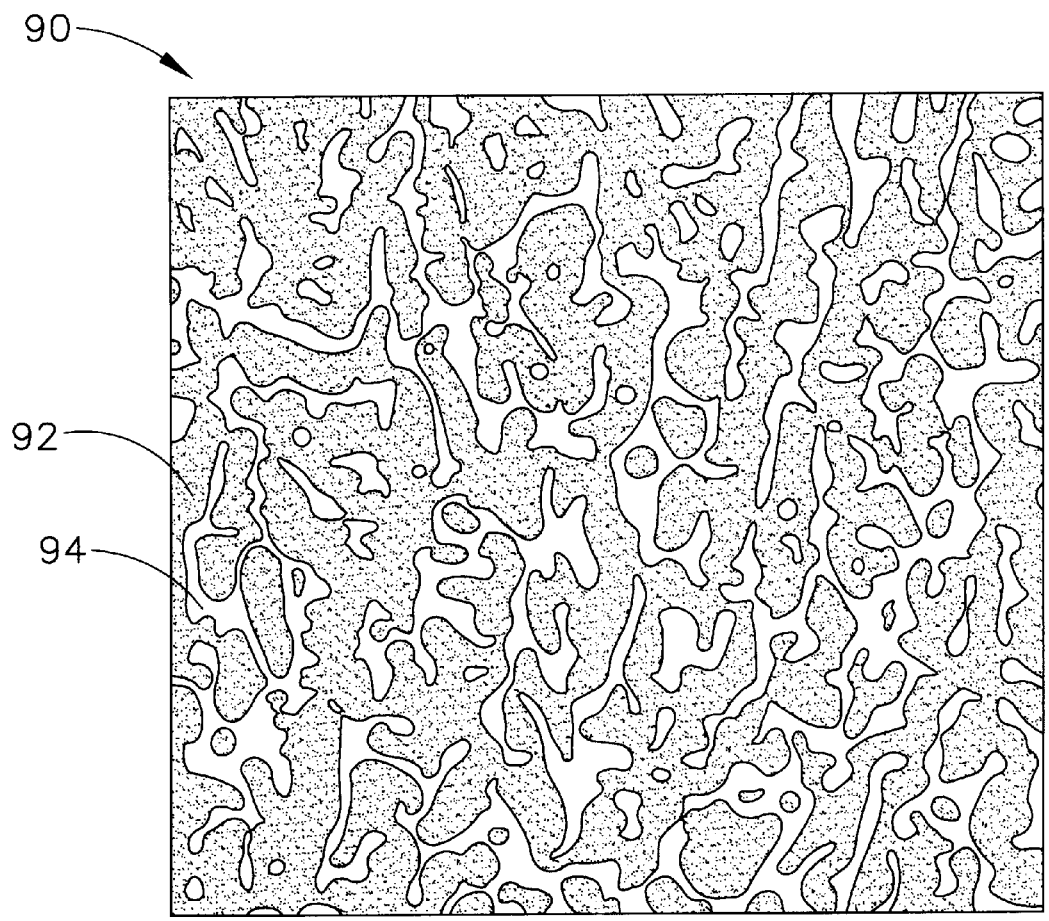
FIG. 6 is a schematic microstructure of the ceramic foam precursor material resulting from the immersion step.

The ceramic foam preform material 90 is shown in FIG. 6. This material is the precursor for the structures shown in FIGS. 1–4 and is similar in many ways. The open-cell solid foam material 90 comprises two interpenetrating, continuous regions 92 and 94. The region 92 comprises the ceramic that constitutes the cell walls, and the region 94 comprises the reaction-product metal. In the preferred case where the sacrificial ceramic is silica and the reactive metal is an aluminum-base metal, the region 92 is alumina (plus any modifiers that were added to the original sacrificial ceramic and remain). The intracellular region 94 is an aluminum-base metal that is also a reaction product but will, in general, have a different composition than that of the initial reactive metal. The region 92 is internally continuous within itself, and the intracellular region 94 is internally continuous within itself. All portions of either region are continuous, so that there is a continuous path from the external surfaces to any location within either phase. A consequence of this structure is that either the region 92 or the region 94, or both regions 92 and 94, may be modified to improve the bondability and/or the properties of the structure, numeral 70. The step 70, if performed, occurs after the immersion step 68 and before subsequent steps.

Two modification techniques are of particular interest in step 70. In one, all or part of the reaction-product metal in the intracellular region 94 is replaced with another metal to improve the bondability and performance of the ceramic foam, numeral 74. Generally, the metal in the intracellular region may be replaced with a metal that is more suitable for particular applications. If the ceramic foam is a component of a gas turbine engine that must withstand elevated temperatures in service, it is desired that the intracellular volume 44 be filled with a nickel-base superalloy. The use of the nickel-base superalloy also enhances the bonding of the ceramic foam 24 to the metallic nonfoam region 22. In the preferred case, where the intracellular region 94 is filled with an aluminum-base material after the immersion step, this intracellular reaction-product metal is replaced with an intracellular nickel-base superalloy to form the intracellular volume 44.

To accomplish the replacement, the preform resulting from the immersion step 68 is immersed into a bath of the replacement liquid metal, such as nickel-base or copper-base alloys. The preform is maintained in the replacement liquid metal for a period of time, which depends upon the thickness of the composite material. This immersion allows diffusion to take place such that the aluminum is replaced by the liquid replacement metal from the bath. As an example, the aluminum/aluminum oxide composite material may be immersed in a nickel-base alloy for 8 hours at 1600° C. to effect the substantially complete replacement of the aluminum phase by the nickel-base alloy.

In a second modifying approach, numeral 72, the reaction-product metal may be removed from the intracellular region 94. The approach to removing the reaction-product metal in the intracellular region 94 will vary according to the composition of the metal. In the preferred case, all or part of the aluminum-base reaction-product metal may be chemically removed by dissolution in an appropriate chemical. For example, aluminum-base metals may be removed by reaction with HCl or NaOH. An electrical field may be applied so that the metal is removed anodically.

The modification techniques 72 and 74 may be used to produce different structures in different parts of the ceramic foam region 24, resulting in a structure having the subregions 30 and 32 of FIG. 4. The selective replacement or removal may be readily accomplished using conventional masking techniques. The selection of which areas are to experience metal removal or replacement depends upon the specific application. However, it is usually desirable that the portion of the ceramic foam region 24, here the first ceramic foam subregion 30, that is adjacent to the metallic nonfoam region 22 have the intracellular volume 44 filled with the intracellular metal that is somewhat similar in composition to the metal of the nonfoam region 22. This similarity of composition aids in achieving an acceptable bond at a joint 46 between the ceramic foam region 24 and the metallic nonfoam region 22.

A coating 50 may be applied to all or a portion of an external surface 52 of the ceramic foam region 24, FIG. 4. The coating may serve to seal the porosity in the subregion 32 or to protect the intracellular metal in the subregion 30. The coating 50 may be a ceramic, such as a ceramic paste that is applied and fired. For example, an alumina paste may be applied to seal the porosity of the subregion 32. The coating 50 may instead be a protective layer such as a diffusion aluminide or overlay aluminide coating, with an optional overlying thermal barrier coating. Such coatings are known in the art for other purposes. For example, a thermal barrier coating system may be applied overlying the subregion 30 (and the nonfoam region 22).

An advantage of the present invention is that the size, shape, and/or dimensions of the article, as well as its precursor structures, may be adjusted as necessary at any of several steps in the process. For example, the fired precursor material of step 66, which is silica in the preferred embodiment, may be reshape or resized by glass shaping techniques or machining. After the contacting/immersing step 68, or the steps 70, 72 or 74, the ceramic foam region 24 may be coarse machined and/or fine machined to adjust its size and dimensions, or to add detail features.

This completes the preparation of the ceramic foam region 24 as a freestanding precursor component.

The metallic nonfoam region 22 is provided, numeral 76. The metallic nonfoam region 22 is fabricated by any operable technique. The fabrication of the metallic nonfoam region 22 is known in the art, and does not form a part of the present invention, except as discussed next.

The ceramic foam region 24 is joined to the metallic nonfoam region 22 at the joint 46, numeral 78. A metallurgical bond is preferred as the joint 46. The joining may be accomplished by any operable technique that achieves a joint between the ceramic foam region 24 and the metallic nonfoam region 22. Five examples of preferred joining techniques are presented next. The bond may be produced by resistance welding, in which an electrical current is applied through the ceramic foam region 24 and the metallic nonfoam region 22 to produce heating, melting, and interdiffusion at the interface 30. The bond may instead be produced by pressing the ceramic foam region 24 and the metallic nonfoam region 22 together and heating the assembly in a furnace to cause the metal of the ceramic foam region 24 and the metal of the metallic nonfoam region 22 to interdiffuse, either in the solid state or the liquid state, to form the diffusional joint 46. For this approach, the ceramic foam region 24 would necessarily constitute the first ceramic foam subregion 30 with an intracellular metal. In a third approach, the ceramic foam region 24 is heated to a temperature above the melting point of the intracellular metal, and then the ceramic foam region is brought into contact with the nonfoam region 22. In a fourth approach, a brazing metal with a melting temperature lower than the metals of the ceramic foam region 24 and the metallic nonfoam region 22 may be placed between the regions 22 and 24, melted, and thereafter cooled, whereupon the ceramic foam and metallic foam region 22 are bonded together.

In each of the first four joining approaches, the ceramic foam region 24 and the metallic nonfoam region 22 are first prepared as freestanding elements and then joined together. A fifth joining approach 78 differs in that the ceramic foam region 24 is prepared as a freestanding element, but the metallic nonfoam region 22 is furnished as a liquid metal and then cast around the metallic nonfoam region 22 to form the casting joint 46. The ceramic foam region is positioned within a casting mold, and then the liquid metal is provided and cast into the mold and solidified. Solidification may be directional to produce an oriented polycrystal or single crystal (if a seed, constriction, or other growth source is used), or nondirectional to produce a generally equiaxed structure.

The coating 50 as discussed earlier may be applied at this stage of the processing as well.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An article of manufacture, comprising:
   a metallic nonfoam region, wherein the nonfoam region comprises a primary nickel-base superalloy; and
   a ceramic foam region joined to the metallic nonfoam region, wherein the ceramic foam region comprises an open-cell solid foam made of ceramic cell walls having intracellular volume therebetween,
   wherein the ceramic cell walls comprise a ceramic oxide, and
   wherein the intracellular volume is selected from the group consisting of empty porosity and an intracellular metal.

2. The article of claim 1, wherein the intracellular volume is empty porosity.

3. The article of claim 1, wherein the intracellular volume comprises the intracellular metal.

4. The article of claim 1, wherein the intracellular volume comprises an intracellular nickel-base superalloy.

5. The article of claim 1, wherein the ceramic foam region comprises
   a first ceramic foam subregion having a first intracellular volume that is empty porosity, and
   a second ceramic foam subregion having a second intracellular volume comprising the intracellular metal.

6. The article of claim 1, wherein the article is a component of a gas turbine engine.

7. The article of claim 1, further including
   a casting joint between the nonfoam region and the ceramic foam region.

8. The article of claim 1, wherein the ceramic oxide comprises an alumina-based material.

9. The article of claim 1, wherein the intracellular metal is a replacement metal selected from the group consisting of a nickel-base alloy and a copper-base alloy.

10. The article of claim 1, wherein the article is a component of a gas turbine engine selected from the group consisting of a combustor component, a vane, a turbine blade, and a stationary shroud.

11. An article of manufacture, comprising:
    a metallic nonfoam region;
    a ceramic foam region joined to the metallic nonfoam region, wherein the ceramic foam region comprises an open-cell solid foam made of ceramic cell walls having intracellular volume therebetween,
    wherein the ceramic cell walls comprise ceramic oxide, and
    wherein the intracellular volume is selected from the group consisting of empty porosity and an intracellular metal; and
    a diffusional joint between the metallic nonfoam region and the ceramic foam region.

12. An article of manufacture comprising a component of a gas turbine engine, the component comprising:
    a metallic nonfoam region comprising a primary nickel-base superalloy; and
    a ceramic foam region joined to the metallic region, wherein the ceramic foam region comprises an open-cell solid ceramic foam made of alumina cell walls having intracellular volume therebetween.

13. The article of claim 12, wherein the intracellular volume is empty porosity.

14. The article of claim 12, wherein the intracellular volume comprises an intracellular nickel-base superalloy.

15. The article of claim 12, wherein the ceramic foam region comprises a first ceramic foam subregion wherein the intracellular volume is empty porosity, and a second ceramic foam subregion wherein the intracellular volume comprises a nickel-base superalloy.

16. An article of manufacture, comprising:

a metallic nonfoam region; and a ceramic foam region joined to the metallic nonfoam region, wherein the ceramic foam region comprises an open-cell solid foam made of ceramic cell walls having intracellular volume therebetween, wherein the ceramic cell walls comprise a ceramic oxide, and wherein the intracellular volume comprises an intracellular nickel-base superalloy.

17. The article of claim 16, wherein the nonfoam region comprises a primary nickel-base superalloy.

18. The article of claim 16, wherein the ceramic foam region comprises a first ceramic foam subregion having an intracellular volume that is empty porosity, and a second ceramic foam subregion having the intracellular nickel-base superalloy therein.

19. The article of claim 16, wherein the article is a component of a gas turbine engine.

20. The article of claim 16, wherein the ceramic oxide comprises an alumina-based material.

21. The article of claim 16, further including a casting joint between the metallic nonfoam region and the ceramic foam region.

* * * * *